(12) United States Patent
Yoshida

(10) Patent No.: US 7,391,446 B2
(45) Date of Patent: Jun. 24, 2008

(54) DIGITAL CAMERA HAVING CIRCUITRY SHORTENING PROCESSING TIME TO CORRECT DISTORTION

(75) Inventor: Masanori Yoshida, Saitama (JP)

(73) Assignee: Fujifilm Corporation, Tokyo (JP)

( * ) Notice: Subject to any disclaimer, the term of this patent is extended or adjusted under 35 U.S.C. 154(b) by 761 days.

(21) Appl. No.: 10/690,616

(22) Filed: Oct. 23, 2003

(65) Prior Publication Data
US 2004/0080633 A1 Apr. 29, 2004

(30) Foreign Application Priority Data
Oct. 24, 2002 (JP) ............... 2002-310106

(51) Int. Cl.
*H04N 5/262* (2006.01)
(52) U.S. Cl. ................. 348/240.99; 348/222.1
(58) Field of Classification Search ............. 348/246.3, 348/240.2, 240.1, 240.99
See application file for complete search history.

(56) References Cited

U.S. PATENT DOCUMENTS 5,905,530 A * 5/1999 Yokota et al. .......... 348/240.99
7,098,949 B2 * 8/2006 Stavely .................. 348/240.2
2001/0028398 A1 * 10/2001 Takahashi ............... 348/241
2002/0047904 A1 * 4/2002 Okada .................... 348/207
2005/0111110 A1 * 5/2005 Matama ................... 359/687

FOREIGN PATENT DOCUMENTS

JP 2000-3437 A 1/2000
JP 2001-5956 A 1/2001

* cited by examiner

*Primary Examiner*—Lin Ye
*Assistant Examiner*—Gevell Selby
(74) *Attorney, Agent, or Firm*—Birch, Stewart, Kolasch & Birch, LLP

(57) ABSTRACT

A telephoto side distortion allowable lens or a wide-angle side distortion allowable lens is used as a zoom lens of a digital camera. Image data photographed by the telephoto side distortion allowable lens is subject to only a telephoto side distortion correction. Image data photographed by the wide-angle side distortion allowable lens is subject to only a wide-angle side distortion correction, in order to shorten the processing time for the distortion correction.

6 Claims, 4 Drawing Sheets

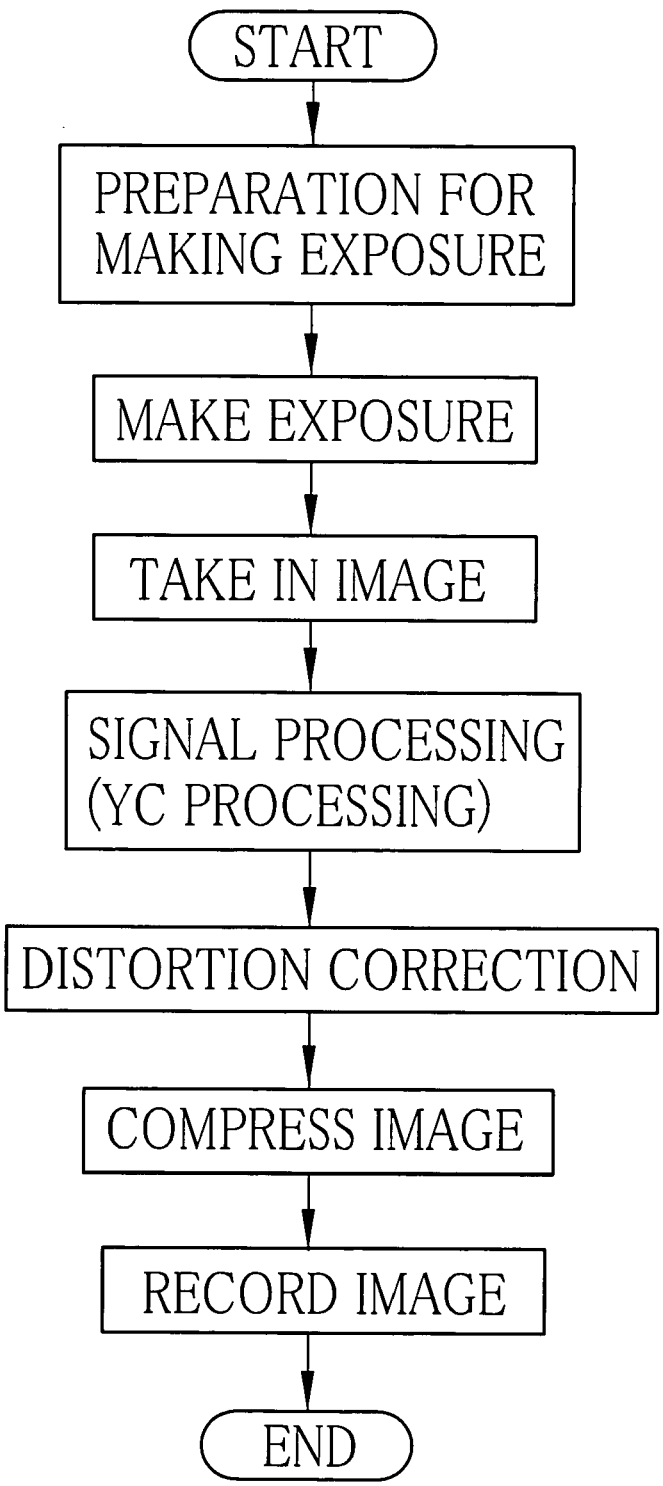

DIGITAL CAMERA HAVING CIRCUITRY SHORTENING PROCESSING TIME TO CORRECT DISTORTION

This nonprovisional application claims priority under 35 U.S.C. §119(a) on Patent Application No. 2002-310106 filed in JAPAN on Oct. 24, 2002, which is herein incorporated by reference.

BACKGROUND OF THE INVENTION

1. Field of the Invention

The present invention relates to a digital camera which shortens processing time for correcting distortion.

2. Background Arts

A digital camera converts an optical image of a subject photographed by a CCD and the like into digital image data, which is recorded on a recording medium such as an internal memory or a memory card. Recently, the digital camera that adopts zoom function is preferred. Since an optical zoom is superior to a digital zoom in terms of image quality and response speed, a digital camera with a zoom lens is widely used.

To miniaturize the digital camera, a small and thin zoom lens is effectively adopted. An optical image photographed by this type of zoom lens, however, tends to distort severely. Generally, the photographed image distorts in a barrel shape, as illustrated in solid lines in FIG. 4A, when the zoom lens is on the wide-angle side. When the zoom lens is on the telephoto side, on the other hand, the photographed image distorts in a pincushion shape, as shown in FIG. 4B.

Japanese Patent Laid-Open Publication No. 2000-3437 discloses a method for correcting distortion by use of an image processing system such as a personal computer after photography. Japanese Patent Laid-Open Publication No. 2001-5956 discloses a digital camera which corrects distortion in image processing inside the camera.

The above digital camera carries out distortion correction processes for each of the barrel distortion on the wide-angle side and the pincushion distortion on the telephoto side. Thus, the processing time for distortion correction becomes long. When the digital camera carries out the process to correct the distortion inside the digital camera, long processing time adversely affects reduction in the time interval between exposures.

SUMMARY OF THE INVENTION

An object of the present invention is to provide a digital camera that can shorten processing time to correct distortion.

To achieve the above object, a digital camera according to the present invention comprises a zoom lens, an imaging device, and a signal processing circuit. The zoom lens has high optical distortion on a telephoto side as compared with on a wide-angle side. The imaging device photoelectrically converts subject light passing through the zoom lens, to generate image data. The signal processing circuit corrects the optical distortion only on the telephoto side.

The signal processing circuit may adopt a large distortion correction parameter, as the magnifying power of the zoom lens becomes high. The signal processing circuit may skip the distortion correction process when the magnifying power of the zoom lens is lower than a predetermined value.

The digital camera according to the present invention may use a zoom lens which has high optical distortion on the wide-angle side as compared with on the telephoto side, instead of the zoom lens described above. In this case, the signal processing circuit subjects the image data to only a wide-angle side distortion correction process.

According to the present invention, the digital camera corrects the distortion on either the wide-angle side or the telephoto side, so that it is possible to shorten the processing time for distortion correction.

BRIEF DESCRIPTION OF THE DRAWINGS

The above objects and advantages of the present invention will become apparent from the following detailed descriptions of the preferred embodiments when read in association with the accompanying drawings, which are given byway of illustration only and thus do not limit the present invention. In the drawings, the same reference numerals designate like or corresponding parts throughout the several views, and wherein:

FIG. 3 is a flowchart of the image processing of the digital camera; and

DETAILED DESCRIPTION OF THE EMBODIMENTS

Figure 1:
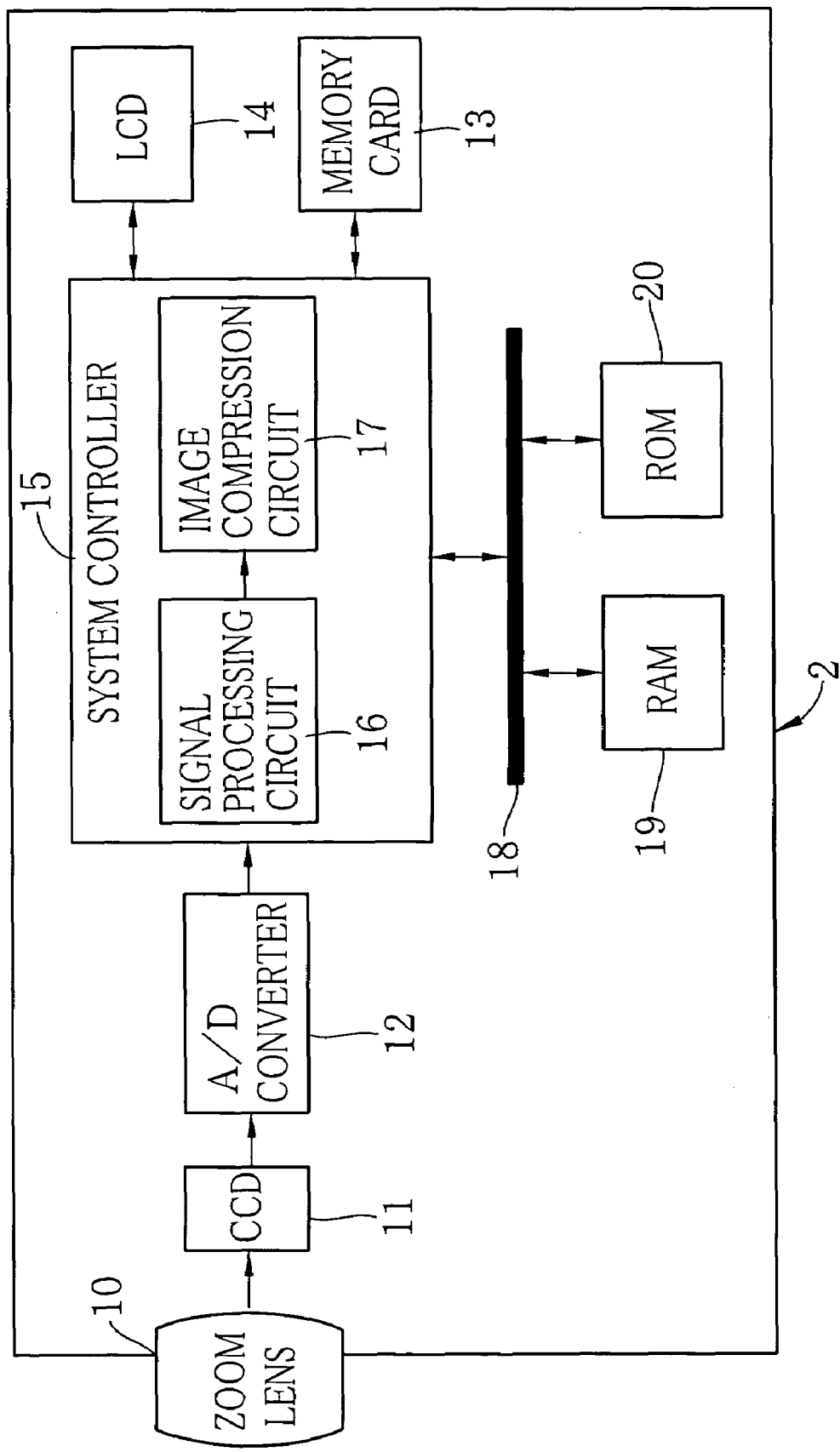
FIG. 1 is a block diagram of the schematic structure of a digital camera.

Referring to FIG. 1, a zoom lens 10 of a digital camera 2 comprises a main lens element and a movable lens element (neither is illustrated) which moves on the optical axis of the main lens element. The movable lens element moves in ten steps, for example, between a telephoto side and a wide-angle side.

A telephoto side distortion allowable lens or a wide-angle side distortion allowable lens is used as the main lens element of the zoom lens 10. The telephoto side distortion allowable lens has small optical distortion on the wide-angle side, instead of allowing optical distortion on the telephoto side. The wide-angle side distortion allowable lens, on the other hand, has small optical distortion on the telephoto side, instead of allowing optical distortion on the wide-angle side. An amount of optical distortion in accordance with the magnifying power of the zoom lens 10 is known in advance.

A CCD (charge coupled device) 11, as an imaging device, is disposed behind the zoom lens 10. The CCD 11 photoelectrically converts subject light, which forms an optical image on a light receiving surface, into photographic signals. The analog photographic signals outputted from the CCD 11 are converted into digital image data by an A/D (analog-to-digital) converter 12. A LCD (liquid crystal display) 14 displays image data as a through image. The LCD 14 is used for reproducing a photographed image and setting various photographic conditions, in addition to displaying the through image. Upon pressing a release button (not illustrated), image data displayed on the LCD 14 at that time is recorded on a memory card 13 as a photographed image.

A system controller 15, including a signal processing circuit 16 and an image compression circuit 17, controls the whole digital camera 2 on the basis of input signals from an operation section (not illustrated). The system controller 15 is connected to a RAM 19 and a ROM 20 through a data bus 18.

The ROM 20 stores the various control programs and setting information of the digital camera 2. The system controller 15 reads the predetermined control program from the ROM 20 and stores it to the RAM 19 as a working memory, in order to execute various processes. The RAM 19 is, for example, a SDRAM (Synchronous Dynamic Random Access Memory).

Image data outputted from the A/D converter 12 is temporarily recorded on the RAM 19 via the system controller 15 and the data bus 18. The signal processing circuit 16 converts image data represented by RGB into luminance signals Y and color-difference signals Cr and Cb. Then, image data is subject to various signal processes such as gamma correction, white balance correction, sharpness correction.

The signal processing circuit 16, as disclosed in Japanese Patent Laid-Open Publication No. 2000-3437, calculates the amount of distortion of each pixel, based on the distortion information of the lens with respect to the center of the photographed image and the resolution information of the image. An amount of coordinate transformation in each direction of x-axis and y-axis is obtained for every pixel, on the basis of the amount of distortion. Then, the signal processing circuit 16 calculates image data (Y, Cr and Cb) of each pixel with the interpolation operation, under the condition after the coordinate transformation.

Figure 2:
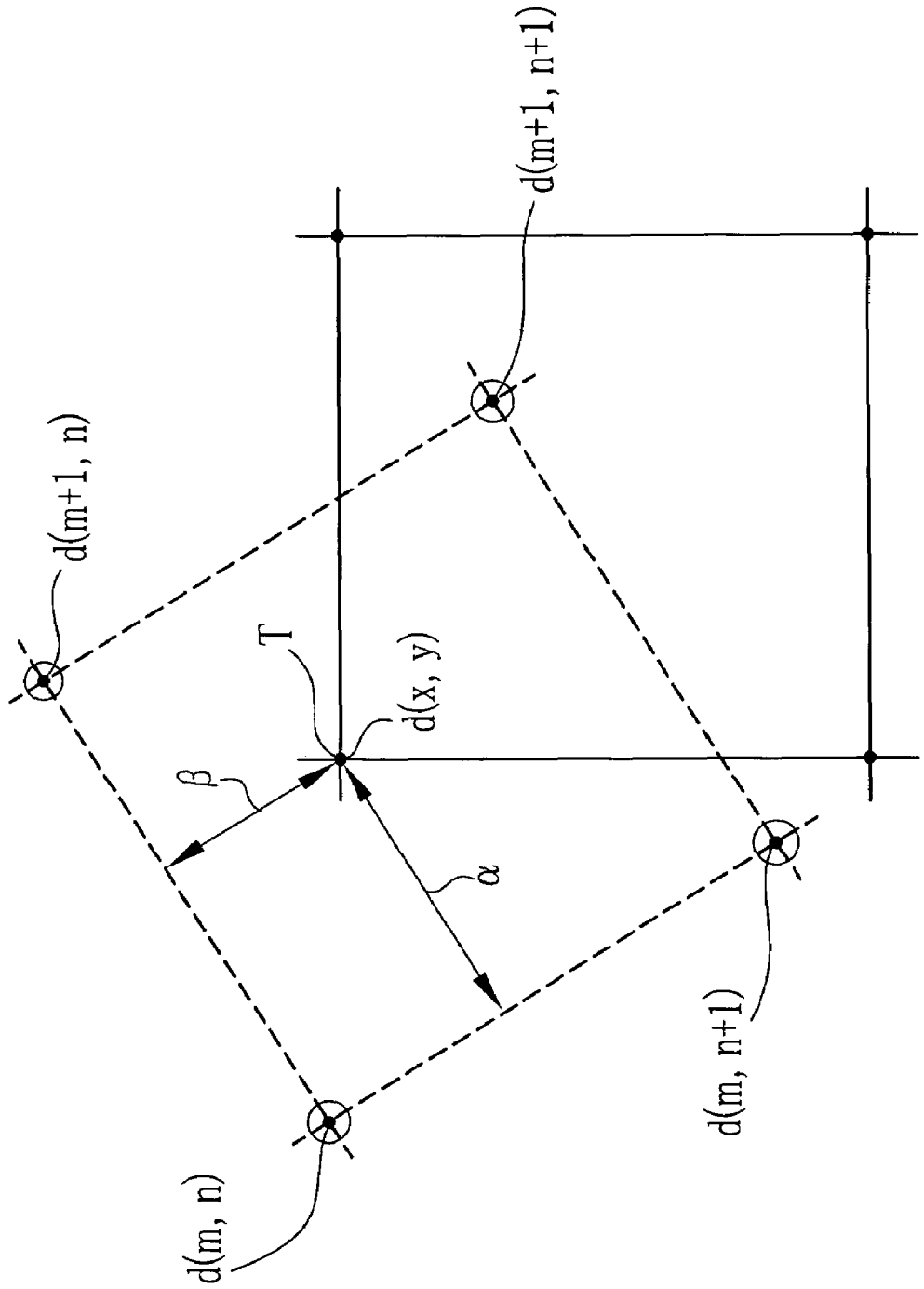
FIG. 2 is an explanatory view of an interpolation operation to obtain image data of each pixel after coordinate transformation.
Figure 4B:
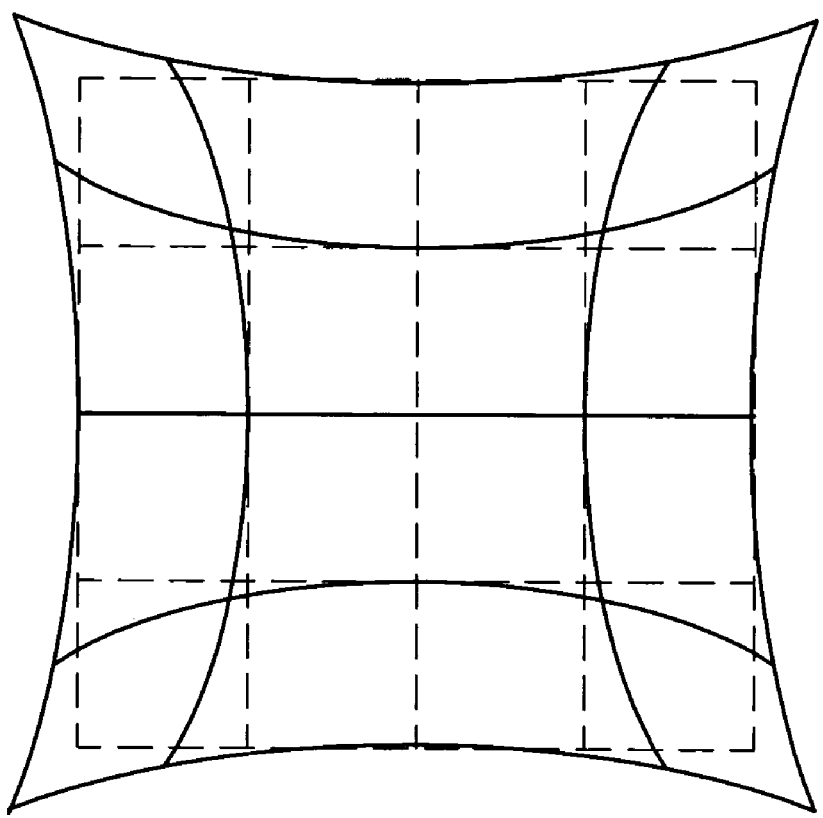
FIG. 4B is an explanatory view of a pincushion distortion appearing in the photographed image when the zoom lens is on a telephoto side.
Figure 4A:
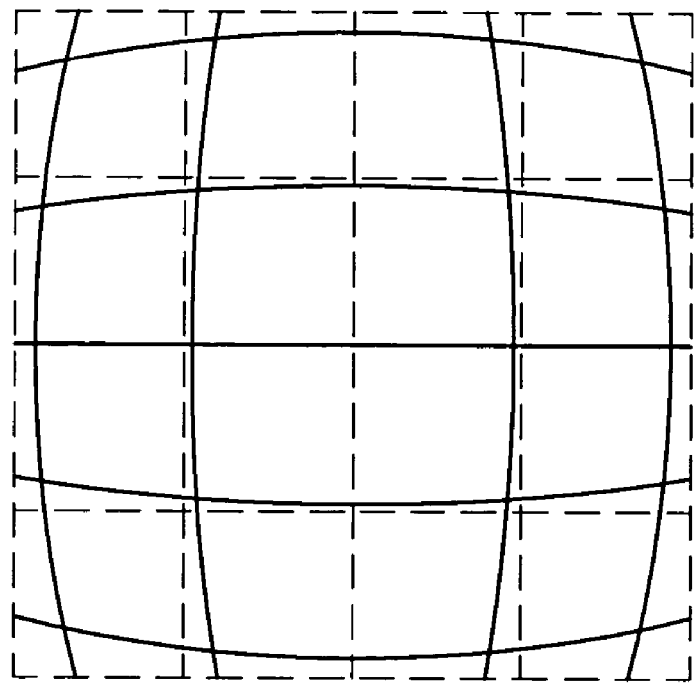
FIG. 4A is an explanatory view of a barrel distortion appearing in a photographed image when a zoom lens is on a wide-angle side.

More specifically, in FIG. 2 explaining the interpolation operation, solid lines show the position of the image before the coordinate transformation, and broken lines show the position of the image after the coordinate transformation. Image data d(x, y) of a pixel T is calculated on the basis of intensity of four pixels d(m, n), d(m+1, n), d(m, n+1), and d(m+1, n+1), which are disposed in the vicinity of the pixel T after the coordinate transformation, by use of the following equation:

$$d(x, y)=d(m, n)(1-\alpha)(1-\beta)+d(m+1, n)\alpha(1-\beta)+d(m, n+1)(1-\alpha)\beta+d(m+1, n+1)\alpha\beta$$

wherein, $\alpha$ and $\beta$, corresponding to correction parameters, designate deviation in the position of the pixel before and after the coordinate transformation. Each image data (Y, Cr and Cb data) of every pixel is subject to the interpolation operation to correct the distortion.

When correcting the pincushion distortion, since an effective image area after correcting distortion becomes smaller than an actual image area, the image has to be scaled up. When correcting the barrel distortion, on the other hand, since the effective image area after correcting distortion becomes larger than the actual image area, the image has to be scaled down. To correct chromatic aberration, image data of Y, Cr and Cb may be inversely converted into image data of R and B. Using the distortion information and chromatic aberration information of each color, distortion is corrected in each image data of R and B. In this case, image data of R and B after correcting chromatic aberration is re-converted into the luminance signals Y and color-difference signals Cr and Cb before output.

In the event of the zoom lens 10 allowing distortion on the telephoto side, distortion increases on the telephoto side and reduces on the wide-angle side. Therefore, it is preferable that the value of the correction parameter increases as the magnifying power increases, in order to properly correct distortion in accordance with the magnifying power of the zoom lens 10. Likewise, in the event of the zoom lens 10 allowing distortion on the wide-angle side, distortion increases on the wide-angle side and reduces on the telephoto side. Therefore, it is preferable that the value of the correction parameter increases as the magnifying power decreases.

In the event of the zoom lens 10 allowing distortion on the telephoto side, only distortion on the telephoto side is corrected. The signal processing circuit 16 electrically corrects the distortion in accordance with the magnifying power of the zoom lens 10. In other words, the higher the magnifying power, the larger the distortion correction parameter. Distortion is slight when the magnifying power is low, so that distortion may be corrected only when the magnifying power is higher than a predetermined value.

When the zoom lens 10 allows distortion on the wide-angle side, only distortion on the wide-angle side may be corrected. In this case, distortion is properly corrected, because the lower the magnifying power, the larger the distortion correction parameter. Distortion is slight when the magnifying power is high, so that distortion may be corrected only when the magnifying power is lower than a predetermined value.

The image compression circuit 17 compresses image data after the distortion correction in a predetermined format, for example, a JPEG (Joint Photographic Experts Group) format. Compressed image data is recorded on the memory card 13.

Referring to a flowchart of FIG. 3, the operation of the digital camera 2 will be hereinafter described. The digital camera 2 makes preparations for making an exposure, such as AE (automatic exposure) control, AF (automatic focusing) control and the like, to adopt proper f-number and exposure time. Upon pressing the shutter button, the subject image is taken into the digital camera 2 as the photographic signals. The A/D converter 12 converts the photographic signals into digital image data, and records image data on the RAM 19.

The signal processing circuit 16 subjects image data to the various signal processes including the YC process. Then, image data is subject to the distortion correction process. When the main lens element of the zoom lens 10 is the telephoto side distortion allowable lens, only the distortion on the telephoto side is corrected. When it is the wide-angle side distortion allowable lens, only the distortion on the wide-angle side is corrected. The image compression circuit 17 compresses corrected image data, and records it on the memory card 13. Therefore, the digital camera 2 corrects distortion on either the wide-angle side or the telephoto side, so that it is possible to shorten the processing time for distortion correction.

Although the present invention has been described with respect to the preferred embodiment, the present invention is not to be limited to the above embodiment but, on the contrary, various modifications will be possible to those skilled in the art without departing from the scope of claims appended hereto.

What is claimed is:

1. A digital camera comprising:
    a zoom lens having wide-angle side and a telephoto side, the zoom lens including a main lens element in which there is high optical distortion on the telephoto side that needs correcting as compared with the optical distortion on the wide-angle side that does not need correcting;
    an imaging device for photoelectrically converting subject light passing through said zoom lens, to generate image data; and
    a signal processing circuit for subjecting said image data to a distortion correction process, when the zoom lens is set on said telephoto side and not subjecting said image data to a distortion correction when the zoom lens is set on the wide-angle side.

2. A digital camera as recited in claim 1, wherein said signal processing circuit adopts a large distortion correction parameter as the magnifying power of said zoom lens becomes high.

3. A digital camera as recited in claim 1, wherein said signal processing circuit skips said distortion correction process when magnifying power of said zoom lens is lower than a predetermined value.

4. A digital camera comprising:

a zoom lens having wide-angle side and a telephoto side, the zoom lens including a main lens element in which there is high optical distortion on the wide-angle side that needs correcting as compared with the optical distortion on the telephoto side that does not need correcting;

an imaging device for photoelectrically converting subject light passing through said zoom lens, to generate image data; and a signal processing circuit for subjecting said image data to a distortion correction process, when the zoom lens is set on said wide-angle side and not subjecting said image data to a distortion correction when the zoom lens is set on the telephoto side.

5. A digital camera as recited in claim 4, wherein said signal processing circuit adopts a larger distortion correction parameter as the magnifying power of said zoom lens becomes low.

6. A digital camera as recited in claim 4, wherein said signal processing circuit skips said distortion correction process when magnifying power of said zoom lens is higher than a predetermined value.

* * * * *